United States Patent [19]

Holtschmidt et al.

[11] 4,408,031

[45] Oct. 4, 1983

[54] PROCESS FOR THE PREPARATION OF HEAT-CURABLE SILICONE RESINS USABLE ESPECIALLY AS ELECTRICAL INSULATING RESINS

[75] Inventors: Ulrich Holtschmidt; Götz Koerner, both of Essen; Manfred Priesch, Recklinghausen; Harald Rau; Christian Weitemeyer, both of Essen, all of Fed. Rep. of Germany

[73] Assignee: TH. Goldschmidt AG, Essen, Fed. Rep. of Germany

[21] Appl. No.: 343,185

[22] Filed: Jan. 27, 1982

[30] Foreign Application Priority Data

Feb. 5, 1981 [DE] Fed. Rep. of Germany ....... 3103932

[51] Int. Cl.$^3$ .............................................. C08G 77/04
[52] U.S. Cl. ..................... 528/26; 428/447; 528/15; 528/17; 528/23; 528/29
[58] Field of Search ............ 528/26, 29, 17, 15, 528/23; 428/447

[56] References Cited

U.S. PATENT DOCUMENTS 3,701,815 10/1972 Matzner et al. .................. 528/26
3,948,856 4/1976 Stackman ........................ 528/26

*Primary Examiner*—Melvyn I. Marquis
*Attorney, Agent, or Firm*—Toren, McGeady & Stanger

[57] ABSTRACT

The invention relates to a process for the preparation of heat-curable resins, usable especially as electrically insulating resins, by the reaction of alkoxy siloxanes of the formula

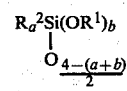

in which
$OR^1$ represents an alkoxy group of primary or secondary aliphatic alcohols with 1 to 4 carbon atoms,
$R^2$ represents an alkyl or a phenyl group,
a has a value of 1.0 to 1.5,
b has a value of 0.1 to 1.0; with
a mixture of low molecular weight, multihydric alcohols consisting of
(a) 25 to 95 mole percent of neopentylglycol hydroxypivalate, and
(b) 75 to 5 mole percent of a low molecular weight, at least trihydric alcohol at temperatures of 80° to 200° C. The resins thus prepared can be utilized advantageously for the insulation of generators, transformers and the like. They possess high elasticity and excellent adhesion.

12 Claims, No Drawings

PROCESS FOR THE PREPARATION OF HEAT-CURABLE SILICONE RESINS USABLE ESPECIALLY AS ELECTRICAL INSULATING RESINS

BACKGROUND OF THE INVENTION

1. Field of the Invention

The invention relates to a process for the preparation of heat-curable silicone resins especially usable as electrically insulating resins.

2. Description of the Prior Art

It is known to produce heat curable silicone resins by the reaction of low molecular weight, multihydric alcohols at temperatures of 80° to 200° C. with alkoxy siloxanes having the formula

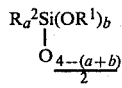

in which

OR$^1$ represents an alkoxy group of primary or secondary aliphatic alcohols with 1 to 4 carbon atoms,
R$^2$ represents an alkyl and/or a phenyl group,
a has a value of 1.0 to 1.5, and
b has a value of 0.1 to 1.0.

If necessary, the reaction can be carried out in the presence of known transesterification catalysts and solvents. The alcohol R$^1$OH formed is removed and the alkoxy siloxanes are reacted with the alcohols in such relative amounts, that one SiOR$^1$ group corresponds approximately to one COH group. The reaction is terminated at a degree of conversion of 25 to 80% by cooling to a temperature of less than 80° C.

The process described in German Offenlegungsschrift No 28 28 990 wherein the preferred siloxane is is one in which a has a value of 1.2 to 1.4 and b is 0.3 to 0.8. As the OR$^1$ group, methoxy is preferred. OR$^1$ can also represent an ethoxy, propoxy or butoxy group and the propoxy and/or butoxy groups may be branched. In the average alkoxy siloxane molecule, a mixture of different OR$^1$ radicals may be used with the molar ratio of methoxy or alkoxy radicals of longer chain length preferably being 2.5 to 1:1.

R$^2$ is especially a methyl and/or a phenyl group. If methyl and phenyl groups are present simultaneously, a molar ratio of 0.4 to 1.5:1 is preferred.

The siloxane should preferably have 10 to 30 mole percent of dimethylsiloxane units and 5 to 10 mole percent of trimethylsiloxane units. Preferably, the siloxane contains 50 to 80 mole percent of monophenylsiloxane units.

As the transesterification catalysts, titanium esters or cobalt salts of organic acids or sulfonic acids, such as, p-toluenesulfonic acid or benzenesulfonic acid are preferably used.

These known silicone resins have very good thermal stability and elasticity, as well as good adhesion to a metallic substrate. A particular advantage of the cured resins is their minimal loss in weight when subjected to heat. The silicone resins described are therefore particularly suitable for use in the electrical industry.

SUMMARY OF THE INVENTION

We have discovered a method for improving the properties of these resins, particularly for use in the electrical industry. In particular, the flexibility of films of the cured resins (determined by the pin bending test) and the adhesion of the resin to mineral boundary surfaces, such as, for example, finely divided mica, as well as to metallic substrates, especially copper, can be significantly improved.

More specifically, we have found that this improvement in properties can be achieved by using in the above outlined reaction sequence, as the low molecular multihydric alcohols, a mixture consisting of (a) 25 to 95 mole percent of neopentylglycol hydroxypivalate and (b) 75 to 5 mole percent of a low molecular, at least trihydric alcohol, and reacting this mixture with the alkoxy siloxanes.

The resins prepared according to the method of the present invention, can be used with advantage in the electrical industry, especially for insulating generators, transformers, and the like. They possess high elasticity and excellent adhesion, especially for copper surfaces, required for such use. The resins may be filled with fillers, especially with mineral fillers, such as, for example, mica powder, and then processed into molded articles, such as, panels and the like. It is also possible to impregnate and coat carrier webs, especially of glass fiber fabric and/or mica plates with these resins and to cure them with molding into panels having good elastic properties.

DESCRIPTION OF THE PREFERRED EMBODIMENT

The neopentylglycol hydroxypivalate used in the present invention corresponds to the formula

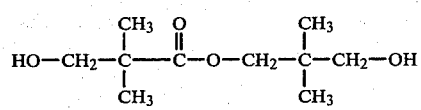

Preferred low molecular weight alcohols which are at least trihydric (component b), are those in which the hydroxyl groups are present as primary hydroxyl groups. Examples of such alcohols are trimethylolethane, trimethylolpropane and pentaerythritol.

The ratio of component (a) to component (b) can vary within relatively wide limits. Products with the required properties are obtained by adhering to a ratio of 25 to 95 mole percent of component (a), and 75 to 5 mole percent of component (b). The use of mixtures in which component (a) is contained in an amount of 30 to 70 mole percent and component (b) correspondingly in an amount of 70 to 30 mole percent, is especially preferred in the reaction.

In addition to components (a) and (b), a hydroxyl group-containing component (c) can be used, which may be present in an amount up to about 50 mole percent and consists of dihydric alcohols, such as, for example, 1,2-dihydroxyethane.

Siloxanes suitable for use in the inventive process include those conventionally known in the art. Especially suitable are those described in German Offenlegungsschrift No. 28 28 990. These siloxanes have the general formula

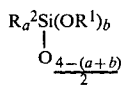

in which
OR$^1$ represents an alkoxy group of primary or secondary aliphatic alcohols with 1 to 4 carbon atoms,
R$^2$ represents an alkyl and/or a phenyl group,
a has a value of 1.0 and 1.5, and
b has a value of 0.1 to 1.0.

As the OR$^1$ groups, methoxy, ethoxy, n-propoxy or iso-propoxy, as well as n-butoxy or iso-butoxy groups are suitable with the methoxy group being especially preferred.

R$^2$ represents alkyl and/or phenyl groups, with the lower alkyl groups having 1 to 4 carbon atoms being preferred. The methyl group is most preferred. However, higher alkyl groups may also be present, for example, alkyl groups with up to 18 carbon atoms. As a rule, however, these are not used as the only R$^1$ groups, but are present in addition to the other lower alkyl groups and especially to methyl groups.

Especially preferred are silicone resins in which R$^1$ represents a methyl as well as a phenyl group. In this connection, a molar ratio of methyl to phenyl groups of 0.4 to 1.5:1 and especially of 0.75:1.25 is preferred. The degree of branching of the siloxane portion of the silicone resin is determined by the indices a and b, a having a value of 1.0 to 1.5, and preferably, of 1.2 to 1.4, and b having a value of 0.1 to 1.0, and preferably, of 0.3 to 0.8.

Within the organosilicon reaction components, compounds are preferred which have 10 to 30 mole percent of dimethylsiloxane units and 5 to 10 mole percent of trimethylsiloxane units. Especially preferred are those compounds which additionally contain 50 to 80 mole percent of monophenylsiloxane units. The siloxanes of the general formula

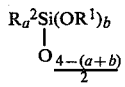

may, for example, be represented by the following average structural formulas

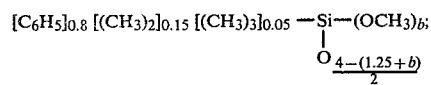

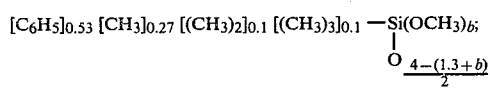

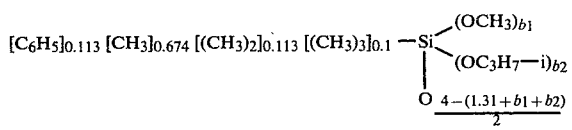

in which b$_1$ + b$_2$ = b;

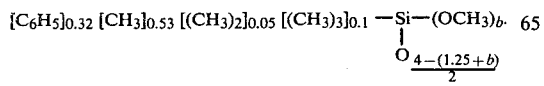

The reaction is carried out at elevated temperatures. In this connection, temperatures of 80° C. to 200° C. have proven themselves to be particularly suitable for carrying out the reaction. The reaction can be accelerated by known transesterification catalysts. Such catalysts are, for example, titanium esters, such as, butyl titanate, as well as cobalt salts, such as, cobalt octoate. Moreover, sulfonic acids, such as, p-toluenesulfonic acid or benzenesulfonic acid, are suitable. The addition of a catalyst is, however, not absolutely necessary.

The reaction can be carried out in the presence of solvents, such as, aromatic solvents, for example, xylene, toluene, or esters, such as, ethylene glycol acetate, or ketones, such as, cyclohexanone, and their mixtures. These solvents may remain in the product of the process or they may be removed by distillation to a desirable residual content.

It is essential in the inventive process that the reaction be terminated by cooling when the degree of conversion has reached 25 to 80% and preferably, 40 to 65%. This degree of conversion can be ascertained by determining the amount of R$^1$OH alcohol released.

The product of the process can be cured by known procedures, especially at elevated temperatures, such as, for example, 200° C. to 250° C. The product can be stored practically indefinitely until it is cured which can be determined by the constancy of the viscosity of the resin, which is dissolved in a solvent for a longer period of time.

For those skilled in the art, it was surprising that products in accordance with the present invention possess the properties outlined hereinabove solely by using the special mixture of low molecular, multihydric alcohols in a well known process. If neopentylglycol hydroxypivalate is used as the only alcoholic component, cloudy, inhomogeneous reaction products are obtained, which cannot be cured to tack-free products. If, on the other hand, component (b) is used, optionally in conjunction with component (c), without the neopentylglycol hydroxypivalate as the esterification component, resins which dry in air but cure to very brittle films and exhibit very poor adhesion to copper surfaces are obtained.

It was thus unexpected that the properties of the products of the present invention could be obtained by the combination of components (a), (b) and optionally (c). It was surprising that the loss in weight after heat treatment of the inventive products is only insignificantly higher than that of products of the process described in German Offenlegunsschrift No. 28 28 990, even though the organic portion relative to the silicone portion is considerably higher in the inventive products than in the products of the German OS No. 28 28 990 process.

The following examples illustrate the inventive process and the product obtained thereby. It is shown by means of a comparison example that, when using neopentylglycol hydroxypivalate as the only esterification component, products which are unsuitable for use are obtained.

EXAMPLE 1 (NOT WITHIN THE INVENTION)

A phenylmethylmethoxy polysiloxane (350 g, 1.68 moles of —OCH$_3$) having the formula

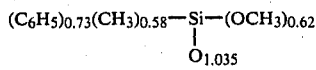

is heated with stirring to 130° C. together with 233 g of xylene, 172 g of neopentylglycol hydroxypivalate (0.84 moles) and 0.5 g of butyl titanate in distillation equipment. Within 1 hour, 55 g of distillate are taken off.

During this time, the temperature rises to 145° C. On reaching the desired viscosity, the reaction is terminated by cooling and the product is adjusted to a solids content of 60% by the addition of methlethyl ketone. The reaction conversion, calculated from the amount of methanol in the distillate is ca. 61%. The end product has a viscosity of 350 cSt at 25° C. and is undesirably cloudy.

EXAMPLE 2 (NOT WITHIN THE INVENTION)

A phenylmethylmethoxy polysiloxane (350 g, 0.9 moles —OCH$_3$) of formula

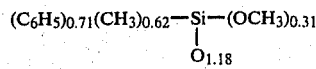

is reaction as described in Example 1 with 6.2 g of 1,2-dihydroxyethane (0.1 moles) 31.2 g of 1,1,1-trimethylolpropane (0.233 moles) and 1. g of butyl titanate. A conversion of 51% is attained. The end product, adjusted to a solids content of 50% with xylene, has a viscosity of 59 cSt at 25° C.

EXAMPLE 3 (WITHIN THE INVENTION)

A phenylmethylmethoxy polysiloxane (350 g, 1.4 moles —OCH$_3$) of formula

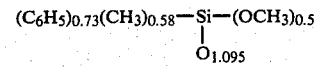

is heated in distillation equipment to 100° C. together with 31 g of 1,1,1-trimethylolpropane (0.233 moles), 71.4 g of neopentylglycol hydroxypivalate (0.35 moles), 233 g of toluene and 1 g of butyl titanate. Within 1.5 hours, 110 g of distillate are taken off. The temperature increases during this time to 118° C. On reaching the desired viscosity, the reaction is terminated by cooling and the product is diluted to a solids content of 50% with diisobutyl ketone. The reaction conversion, calculated from the amount of methanol in the distillate, is ca. 58%. The end product has a viscosity of 27 cSt at 25° C.

EXAMPLE 4 (WITHIN THE INVENTION)

Phenylmethylmethoxy polysiloxane (350 g, 1.4 moles —OCH$_3$) from Example 3 is heated in distillation equipment to 150° C. together with 14.3 g of 1,2-dihydroxyethane (0.23 moles), 20.6 g of 1,1,1-trimethylolpropane (0.16 moles), 47.2 g of neopentylglycol hydroxypivalate (0.23 moles), 117 g of ethylene glycol acetate and 0.2 g of butyl titanate. Within 45 minutes, 40 g of distillate are taken off. The temperature increases to 163° C. On reaching the desired viscosity, the reaction is terminated by cooling and the product is diluted to a solids content of 50% with methylethyl ketone. The reaction conversion is ca. 55%. The end product has a viscosity of 31 cSt at 25° C.

EXAMPLE 5 (WITHIN THE INVENTION)

The phenylmethylmethoxy polysiloxane (350 g, 1.4 moles of —OCH$_3$) of Example 3 is reacted as described in Example 3 with 18.7 g of 1,1,1-trimethylolethane (0.16 moles), 94.7 g of neopentylglycol hydroxypivalate (0.46 moles), 233 g of toluene and 1 g of butyl titanate. A conversion of 48% is attained. The end product, adjusted to a solids content of 50% with methylethyl ketone, has a viscosity of 18 cSt at 25° C.

ANALYSIS OF PRODUCTS

The binders of Examples 1 to 5 were tested as follows:

On a well cleaned copper sheet (cleaning is accomplished by washing with methylethyl ketone at room temperature), a wet film of 60 μm was applied with an enamel knife coater and was cured for 60 minutes at 200° C. The thickness of the stoved enamel film was ca. 30 μm.

The test results for adhesion (grid cut according to DIN 53 151), elasticity (pin bending test according to DIN 53 152) and weight loss according to VDE 0360/Section 2 in percent after a heat treatment of 1,000 hours are given in the Table.

Examples 3, 4, and 5 which are in accordance with the present invention, produce lacquer films with excellent properties. In contrast, the product of Example 1 produces an opaque, tacky lacquer film and the lacquer film from Example 2 gives poor results in the grid cut as well as in the pin bending test. As expected, the weight loss in Examples 3, 4 and 5 is higher because of the higher organic content. Even so, the increase in weight loss in the inventive binders is relatively slight in comparison with the data resulting from Example 2.

TABLE

| Resin from Example | Adhesion Grid cut according to DIN 53 151 | Elasticity Pin bending test according to DIN 53 152 | Weight Loss according to VDE 0360/Section 2 % after 1000 hours at 200° C. |
|---|---|---|---|
| 1 not within the invention | The lacquer films are still tacky, cannot be tested. | | |
| 2 | Gt 4–5 | 10 mm | 5.7 |
| 3 within the invention | Gt 1 | 3 mm | 9.2 |
| 4 | Gt 1–2 | 5 mm | 9.7 |
| 5 | Gt 0–1 | 2 mm | 8.6 |

We claim:
1. In a method for the preparation of heat-curable silicone resins, usable especially as insulating resins, by the reaction of low molecular weight multihydric alcohols with alkoxy siloxanes having the formula

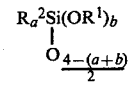

in which
OR$^1$ represents an alkoxy group of primary or secondary aliphatic alcohols with 1 to 4 carbon atoms,
R$^2$ represents an alkyl or a phenyl group,
a has a value of 1.0 to 1.5,
b has a value of 0.1 to 1.0.
at temperatures of 80° to 200° C., optionally in the presence of known transesterification catalysts and solvents, with removal of the alcohol $R^1OH$, the alkoxy siloxanes being reacted with the alcohols in such relative amounts that one $SiOR^1$ group corresponds approximately to one COH group, and the reaction being terminated at a degree of conversion of 25 to 80% by cooling to a temperature of less than 80° C., the improvement which comprises the low molecular weight multihydric alcohols being a mixture of (a) 25 to 95 mole percent of neopentylglycol hydroxypivalate, and (b) 75 to 5 mole percent of a low molecular weight, at least trihydric alcohol.

2. The method of claim 1 wherein the reaction is carried out with a mixture consisting of:

(a) 40 to 80 mole percent of neopentylglycol hydroxypivalate; and (b) 60 to 20 mole percent of a low molecular weight, at least trihydric alcohol.

3. The method of claim 1 or 2 wherein the reaction is carried out with a mixture in which component (b) is an alcohol having predominantly primary hydroxyl groups.

4. The method of claim 3 wherein component (b) is trimethylolethane, trimethylolpropane or pentaerythritol.

5. The method of claim 1, 2, or 4 wherein the reaction is carried out with a mixture of low molecular weight, multihydric alcohols containing up to 50 mole percent of a dihydric alcohol as component (b).

6. The heat-curable silicone resin obtained by the method of claim 1.

7. The heat-curable silicone resin obtained by the method of claim 2.

8. The heat-curable silicone resin obtained by the method of claim 3.

9. The heat-curable silicone resin obtained by the method of claim 4.

10. The heat-curable silicone resin obtained by the method of claim 5.

11. Molded articles formed from the resin of claim 1.

12. A carrier web impregnated with the resin of claim 1.

* * * * *